(12) United States Patent
Bouazizi

(10) Patent No.: US 8,935,420 B2
(45) Date of Patent: Jan. 13, 2015

(54) METHOD AND APPARATUS FOR SYNCHRONIZING NOTIFICATION MESSAGES

(75) Inventor: Imed Bouazizi, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/039,684

(22) Filed: Feb. 28, 2008

(65) Prior Publication Data

US 2008/0222300 A1 Sep. 11, 2008

Related U.S. Application Data

(60) Provisional application No. 60/894,177, filed on Mar. 9, 2007.

(51) Int. Cl.
*G06F 15/16* (2006.01)
*H04H 20/95* (2008.01)
(Continued)

(52) U.S. Cl.
CPC ............... *H04H 20/95* (2013.01); *H04H 20/28* (2013.01); *H04H 20/38* (2013.01); *H04H 20/93* (2013.01); *H04L 12/189* (2013.01); *H04L 12/1895* (2013.01); *H04L 65/608* (2013.01)
USPC ........................................................ 709/231

(58) Field of Classification Search
CPC ... H04L 63/08; H04L 63/10; H04L 2209/603; H04L 65/4076; H04L 29/06027; H04L 29/06; H04L 29/08072; H04L 29/06095; H04L 29/06068; H04L 29/0809; H04N 21/235; H04N 21/84; H04N 21/4348; H04N 21/482; H04N 21/6405; H04N 21/64315; H04H 20/57; H04H 20/93; H04H 2201/16; H04W 72/005; H04W 4/06; H04W 24/02

USPC .......................................................... 709/230
See application file for complete search history.

(56) References Cited

U.S. PATENT DOCUMENTS 6,694,132 B1 * 2/2004 Lausi ......................... 455/404.1
2006/0107287 A1 * 5/2006 Lee et al. ....................... 725/32
(Continued)

FOREIGN PATENT DOCUMENTS

GB 2 419 975 5/2006

OTHER PUBLICATIONS

DVB-H: Electronic Service Guide, ETSI TS 102 471 V1.2.1, Nov. 2006, ETSI, [online], retrieved from the internet from <etsi.org/WebSite/Standards/Standard.aspx>, pp. 1-81 as printed.*
(Continued)

*Primary Examiner* — Taghi Arani
*Assistant Examiner* — Shu Chun Gao
(74) *Attorney, Agent, or Firm* — Banner & Witcoff, Ltd.

(57) ABSTRACT

Various embodiments provide for the splitting of a notification message to a user, where the notification message enables at least one of interactivity and delivery of information associated with a media broadcast service. A first component of the notification message carries media content and is transmitted utilizing a file delivery protocol, such as FLUTE, HTTP, and OMA-PUSH. A second component of the notification message carries any synchronization information associated with the interactivity and the delivery of the information associated with the media broadcast service. The second component of the notification message can be transported in an RTP payload via RTP to allow for accurate synchronization of the notification message with a media stream of the media broadcast service containing the media content.

49 Claims, 6 Drawing Sheets

(51) Int. Cl.
  *H04H 20/28* (2008.01)
  *H04H 20/38* (2008.01)
  *H04H 20/93* (2008.01)
  *H04L 12/18* (2006.01)
  *H04L 29/06* (2006.01)

(56) References Cited

U.S. PATENT DOCUMENTS

2007/0136743 A1* 6/2007 Hasek et al. .............. 725/33
2008/0072258 A1* 3/2008 Jeon et al. ................ 725/48

OTHER PUBLICATIONS

DVB-H: Architecture, ETSI TR 102 469 V1.1.1, May 2006, ETSI, [online], retrieved from the internet from <etsi.org/WebSite/Standards/Standard.aspx>, pp. 1-38 as printed.*

DVB-H: Content Delivery Protocols, ETSI TS 102 472 V1.1.1, Jun. 2006, ETSI, [online], retrieved from the internet from <etsi.org/WebSite/Standards/Standard.aspx>, pp. 1-75 as printed.*

International Search Report for PCT Application No. PCT/IB2008/050752 mailed Feb. 17, 2009.

Office Action in Korean Application No. 2009-7019673 dated Feb. 15, 2011.

English Translation of Office Action in Korean Application No. 2009-7019673 dated Feb. 15, 2011.

Notification Living Document, IP Datacast over DVG-H; Notification, Draft ETSI TS 1XX XXX V0.0.8, Aug. 1, 2007).

Rejection Decision for CN200880013838.7, dated Dec. 5, 2012.

Notification of 3rd Office Action in CN200880013838.7 dated May 3, 2012, with English translation.

Office Action in Korean Patent Application No. 10-2009-7019673, dated Nov. 22, 2011.

English Translation of Office Action in Korean Patent Application No. 10-2009-7019673, dated Nov. 22, 2011.

Office Action for Chinese Patent Application No. 200880013838.7, dated Mar. 24, 2011.

English Translation of Office Action for Chinese Patent Application No. 200880013838.7, dated Mar. 24, 2011.

Communication in EP08719528.5 dated Dec. 10, 2013.

* cited by examiner

```
 0                   1                   2                   3
 0 1 2 3 4 5 6 7 8 9 0 1 2 3 4 5 6 7 8 9 0 1 2 3 4 5 6 7 8 9 0 1
```

| ID | Type | FRAG | Reserved | Header Length |
|---|---|---|---|---|
| Extension Header ID | LEN | Extension Header | | |

Figure 6

METHOD AND APPARATUS FOR SYNCHRONIZING NOTIFICATION MESSAGES

CROSS-REFERENCE TO RELATED APPLICATIONS

The present application claims priority to U.S. Provisional Patent Application No. 60/894,177, filed Mar. 9, 2007.

FIELD OF THE INVENTION

The present invention relates generally to the field of broadcast and multicast systems. More particularly, the present invention relates to notification messaging and functionality within broadcast and multicast systems.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Mobile multicast and broadcast systems have recently been standardized by different organizations, such as the $3^{rd}$ Generation Partnership Project (3GPP) Multimedia Broadcast/Multicast Service (MBMS), the Digital Video Broadcasting (DVB) Technical Module Convergence of Broadcast and Mobile Services (TM-CBMS), and the Open Mobile Alliance (OMA) Mobile Broadcast Services (BCAST) organizations. Other multicast and broadcast systems further include Integrated Services Digital Broadcasting-Terrestrial (ISDB-T), Digital Multimedia Broadcast-Terrestrial/Handheld (DMB-T/H), Digital Multimedia Broadcasting (T-DMB), Forward Link Only (FLO) and proprietary systems, such as for example, MediaFLO. Two primary services provided by such multicast/broadcast solutions are streaming and file delivery services. Although streaming services are considered to be the primary driver of the technology (e.g., the Mobile TV application), file delivery is expected to generate a significant amount of the traffic, as well as a significant amount of the revenues. For example, in the delivery of music and video clips, the file delivery may comprise the primary application component. Alternatively, file delivery may be a secondary component of the application, such as in the case of rich media applications and zapping streams.

In the case of file delivery, File Delivery over Unidirectional Transport (FLUTE) can be used as the file delivery protocol. FLUTE is defined by the Internet Engineering Task Force (IETF) and is based on the Asynchonous Layered Coding (ALC) Protocol Instantiation. ALC comprises a set of building blocks such as the Layered Coding Transport (LCT) block and the Forward Error Correction (FEC) building block. FLUTE extends ALC by, among others, defining mechanisms to describe the contents of the FLUTE session. This is achieved by introducing a well-known object with a Transport Object Identifier (TOI) equal to 0, carrying a File Delivery Table (FDT) instance. The FDT instance lists a set of files and their corresponding transport options. The FDT is an XML file following a schema defined in the FLUTE specification.

Another component of multicast and broadcast services is referred to as a notification service. Notification services complement mobile TV services by offering a way to enable interactivity and delivery of service related information, while also enabling new and/or critical services, such as emergency notifications. A Tsunami notification service is an example of an emergency notification.

DVB TM-CBMS is currently defining a notification framework under the scope of a next Internet Protocol Datacast system (IPDC), IPDC 2.0, that seeks to enable the realization of several use cases, which have already been defined. These use cases are described in "IP Datacast over DVB-H: Notification (Living Document)", TM-CBMS 1520r8, incorporated herein by reference in its entirety. It may be noted that notification use cases can be classified according to the following criteria: whether a notification has strong or loose time constraints, e.g., a notification that should be received within a given time and/or may be processed with various timing requirements; whether a notification is directed to a terminal or to a user, e.g., a notification targeted to the terminal or an application residing thereon, or a notification targeted to the user, where the terminal's involvement in processing the notification goes beyond what is required to present the notification to the user; where a notification is service-related or service-agnostic, a notification that is reliant upon or independent of a service, respectively; and whether a notification requires interactivity or not, e.g., a notification, the main purpose of which is to lead a terminal to subsequent interaction with a network or application.

Notification messages may be large in size if, for example, they contain audio/video and/or other content. Hence, file delivery protocols can be more suitable for the delivery of notification messages when they are bulky. Furthermore, a notification message may be related to a service and have strong synchronization requirements, in addition to possibly requiring some of amount of interactivity. An example of such a notification service is a voting service, which can be tightly synchronized to a service, such as a TV broadcast. Viewers are required to vote within a specific time period which may be as short as a couple of seconds. Thus, audio/video streams must generally be synchronized accurately to the notification service. Any inaccurate synchronization may confuse and mislead the viewer, especially if interactive actions are triggered based on the notification message. Hence, Real Transport Protocol (RTP) may be better suited for delivering notification messages having more stringent synchronization requirements. Currently, there are no defined methods for transporting notification messages which are both bulky and which necessitate the use of RTP in light of their content.

OMA BCAST defines a notification functionality that enables the description of a notification service in an Electronic Service Guide (ESG) and the delivery of the notification data over FLUTE, Short Messaging Service (SMS), or OMA-PUSH. An interactivity document can be used to describe the type of required interaction and can be delivered as a part of the notification message. However, the synchronization mechanism is not sufficiently accurate as it relies on Network Time Protocol (NTP) timestamps. In other words, an NTP timestamp may be used to synchronize a notification message to media streams of a related, actual service. A mapping of RTP timestamps to "wallclock" time is performed at a terminal to synchronize the audio/video streams of the actual service. However, the indicated NTP timestamp represents the time at the audio/video stream generator and does not reflect the time at the terminal. Furthermore, the playout of the audio/video stream is usually delayed due to the time needed for de-jitter buffering. Thus, relying on an NTP timestamp, carried in a notification message, may result in a too-early display of the notification message. It is also possible that the clocks of the media stream generator and the notification message generator are different. Hence, NTP timestamps do not guarantee accurate time synchronization.

It should be noted that a notification entity is different from a stream generation entity. In addition, any buffering time that audio/video streams may need in order to trigger the interaction action quickly before corresponding content is shown on the screen is not taken into account.

Furthermore, using RTP extension headers to add synchronization information to audio/video streams has been proposed, while also splitting the notification message into three separate parts. The proposed three separate parts, include: Synchronization marks inserted into RTP extension headers of the audio/video streams of an actual service, where the synchronization marks can carry an interactive object identifier; an Interactive Descriptor that is used to associate an interactive object with the synchronization marks, while also containing other information, such as timing information; and an Interactive Object that can carry the content or description of the notification message. However, this requires modification of the audio/video streams in order to insert and extract any required headers. In addition, the RTP streams need to be intercepted at the receiver in order to extract the extension headers. It is also not clear what long-term effects can result with regard to RTCP statistics because the RTP streams are altered without modifying the synchronization source (SSRC). Conventionally, extension headers are intended to be used by the media stream receiver and not meant to include information that relates to a completely different instance.

SUMMARY OF THE INVENTION

Various embodiments provide for the splitting of a notification message to a user, where the notification message enables at least one of interactivity and delivery of information associated with a media broadcast service. A first component of the notification message carries media content and is transmitted utilizing a file delivery protocol, such as FLUTE, HTTP, and OMA-PUSH. A second component of the notification message carries any synchronization information associated with the interactivity and the delivery of the information associated with the media broadcast service. The second component of the notification message can be transported in an RTP payload via RTP to allow for accurate synchronization of the notification message with a media stream of the media broadcast service containing the media content.

Therefore, various embodiments allow for the efficient transport of a notification message that has a synchronization requirement associated with a related media broadcast service. However, any larger components of a notification message need not be carried utilizing RTP, which can be inefficient for the transportation of larger messages. Instead, file delivery protocols can be utilized, such as FLUTE, HTTP, and OMA-PUSH.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 6 shows an RTP payload format for use in accordance with various embodiments of the present invention.

DETAILED DESCRIPTION OF THE PREFERRED EMBODIMENTS

Figure 1:
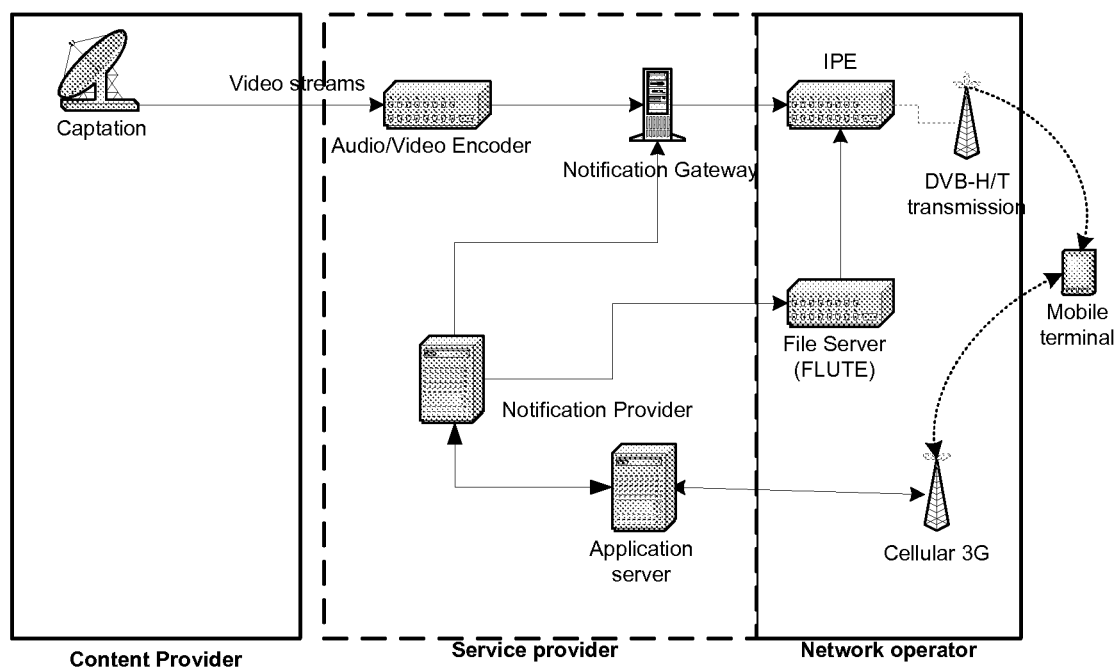
FIG. 1 is an overview diagram of a broadcast and multicast service system within which various embodiments of the present invention may be implemented.

FIG. 1 shows a system 10 illustrating one exemplary architecture of a system for multicast and broadcast services that includes notification functionality. The system 10 can be divided into Content Provider, Service Provider, and Network Operator logical domains. The Content Provider domain, which may include a Captation element 11, can refer to that portion of the system 10 that owns and/or is licensed to sell content and/or content assets. The Content Provider may also in some embodiments be a creator of the content. One purpose of the Content Provider domain is to allow for the acquisition of content by a service provider in the Service Provider domain. It should be noted that the Captation element 11 can refer to any element and/or application capable of capturing desired content.

The Service Provider domain can be utilized to provide an actual service to a subscriber, such as an owner of a mobile terminal 12. It may be noted that different service providers and/or types of service providers can be encompassed by the Service Provider domain, e.g., conventional Internet Service Providers and Content Service Providers. For example, in the context of IP television, the Content Service Provider can acquire and/or license content from one or more content providers and package the content into a service. Therefore, the Service Provider domain can also include an audio/video encoder 14 for encoding content. In addition, the Service Provider domain can include at least some notification services elements, including a notification provider 16, a notification gateway 20, and an application server 18 through which a service provider can provide actual services to the mobile terminal 12.

The Network Operator domain can include a FLUTE file server 24, which in turn can receive notification messages directly from the notification provider 16, and an IP Encapsulator (IPE) 22 which can encapsulate notification messages transmitted through the notification gateway 20. In addition, the IPE 22 can also be utilized to encapsulate notification messages received by the FLUTE file server 24 in IP packets. Whether notification messages are transmitted via the application server 18, the FLUTE file server 24, and/or the IPE 22, connection to the mobile terminal 12 can be effectuated through various types of transmission elements and/or protocols, including but not limited to Digital Video Broadcasting-Handheld/Terrestrial (DVB-H/T) transmission, while and Cellular 3G transmission.

In addition, the mobile terminal 12 can be representative of a Consumer domain, where broadcast and multicast services, such as MBMS services and/or content can be consumed. It may be noted that although a single mobile terminal 12 is shown, multiple devices utilizing various communication protocols can be utilized for service consumption, where the multiple devices can be networked and related in various ways. For example, one or more mobile devices can communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A mobile device may communicate using various media including, but not limited to, radio, infrared, laser, cable connection, and the like.

Figure 2:
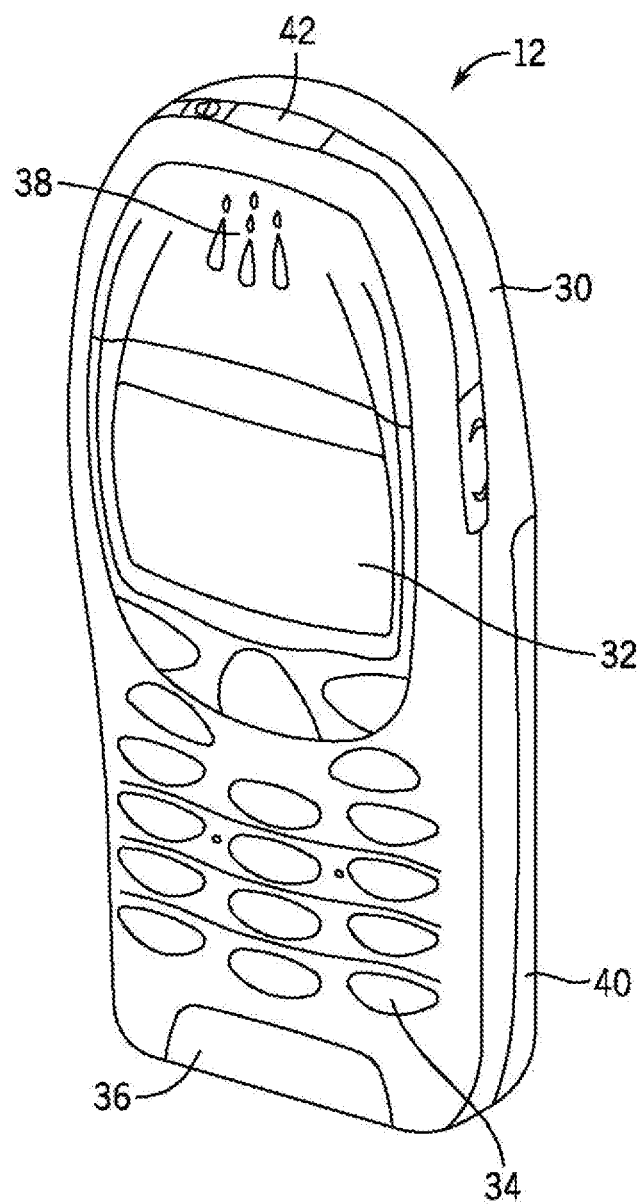
FIG. 2 is a perspective view of a mobile terminal that can be used in the implementation of various embodiments of the present invention.
Figure 3:
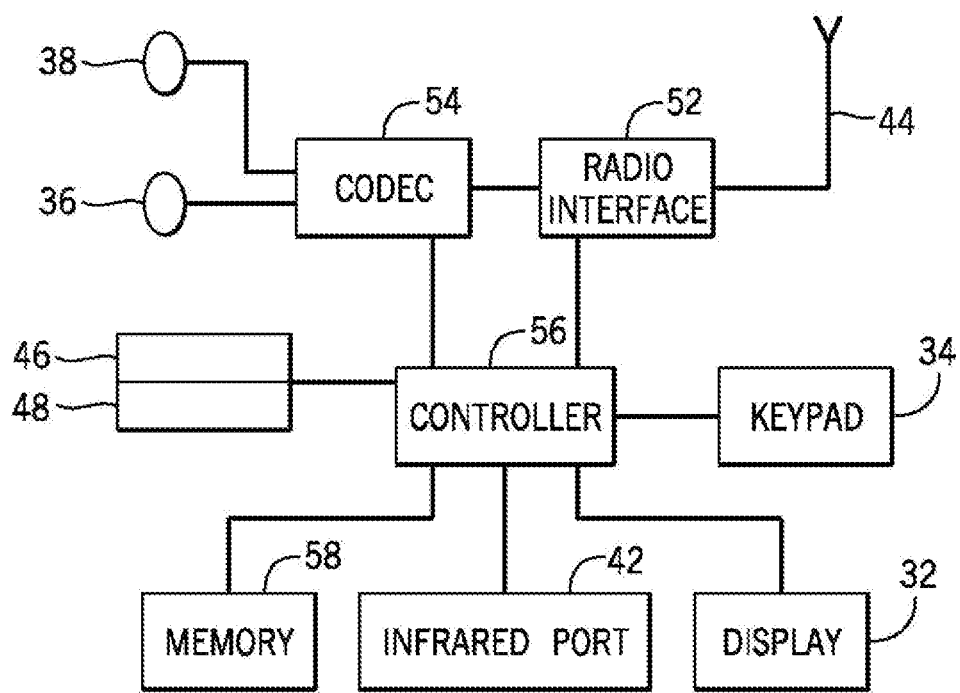
FIG. 3 is a schematic representation of the terminal circuitry of the mobile terminal of FIG. 2.

FIGS. 2 and 3 show one exemplary representative of the mobile terminal 12 which can be utilized in conjunction with various embodiments. It should be understood, however, that the present invention is not intended to be limited to one particular type of electronic device. The mobile terminal 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art, for example in the Nokia range of mobile telephones.

Various embodiments enable the splitting of a notification message from the notification provider 16 into two components. A first component can be referred to as a notification object that can carry, for example, content of the notification message and/or a description of the content of the notification message. In addition, the first component can be large in size and can be delivered in a broadcast mode to a user of the mobile terminal 12 using file delivery methods, including, but not limited to FLUTE, OMA-PUSH, or HTTP. This first component of the notification message can be pre-downloaded, so that it may be available at the mobile terminal 12 well before it is to be utilized. It should also be noted that the first component/notification object can include a first pointer for pointing to other content that comprises at least a part of the notification message. XML can be used as the format for the description of the notification object as it allows for a high flexibility.

A second component of the notification message can be referred to as a notification trigger that can carry, for example, synchronization information, type of notification message information, and/or other related information. The second component/notification trigger can be smaller/shorter in size and can be delivered in a synchronized manner to an actual service (e.g., audio/video stream). It should be noted that the synchronization information may, for example, trigger an interactivity action at a specific instant of a streaming session. RTP can be utilized as an appropriate transport protocol for this second component, thus allowing for accurate synchronization of the notification message and the audio/video streams of the actual service. The notification trigger can also carry information that allows for filtering of notification messages.

Furthermore, the second component of the notification message can carry a second pointer to the first component of the notification message. The second pointer can provide a way to locate the first component of the notification message in, for example, a FLUTE session. The second pointer can also be utilized to point to remotely available content that, for example, can be retrieved over an interactive channel, via HTTP, File Transport Protocol (FTP), and/or any other appropriate file download method. An indication in the second component can be utilized to trigger the pre-downloading of the first component, as described above. This can be performed, for example, shortly before a notification event is signaled to the mobile terminal 12. Therefore, it can be possible to pre-fetch the notification object and all other parts of the notification message a-priori, in order to make sure that all components of the notification message are available when needed.

Figure 4:
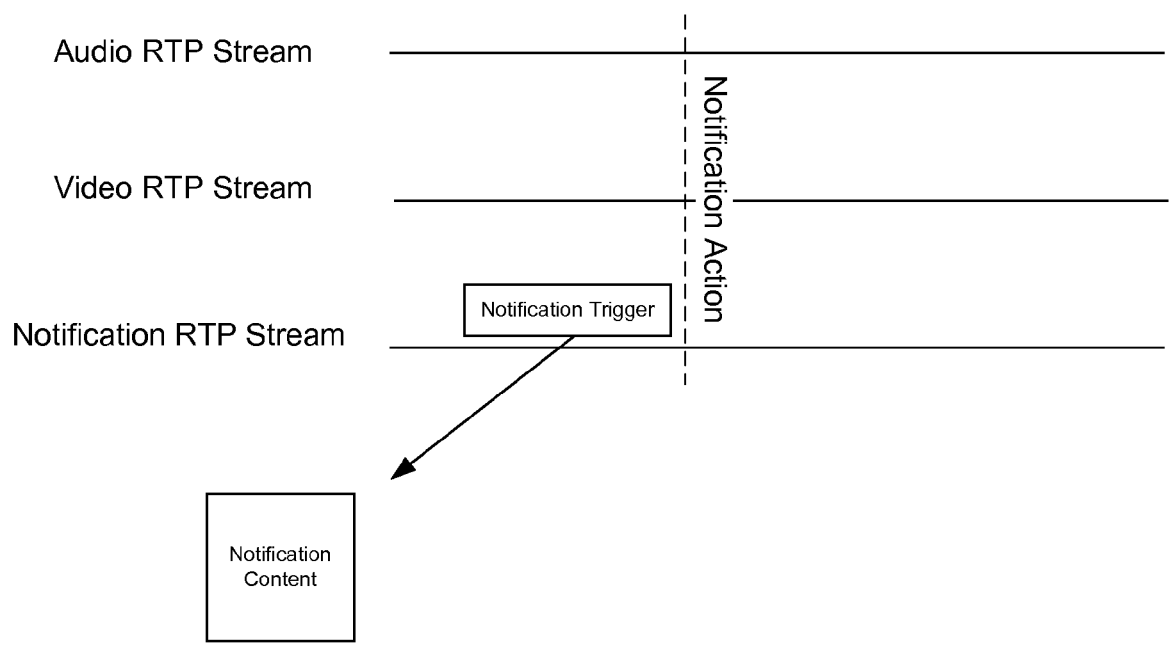
FIG. 4 is a schematic representation of a notification action occurring in accordance with various embodiments of the present invention.
Figure 5:
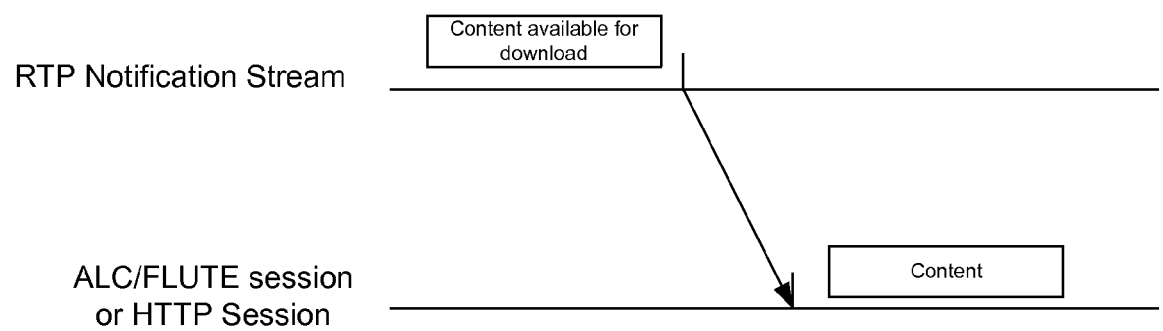
FIG. 5 is a schematic representation of a notification message referencing available content in accordance with one embodiment of the present invention.

FIG. 4 shows a schematic representation of a synchronized notification trigger 400 referencing notification content 410 during a notification action of a streaming service that includes an audio RTP stream, a video RTP stream, and a notification RTP stream. FIG. 5 graphically illustrates an example of notifying an application, for example, that available content exists for download. Block 500 can represent a notification message indicating that content at block 510 is available for download. The notification message can be transmitted in an RTP notification stream, while the content can be found in, for example, an ALC/FLUTE session, an HTTP session, etc.

According to one embodiment, an RTP payload format designed to carry notification messages can be defined, as mentioned above. The RTP payload format may carry various types of information, including but not limited to, information about the type of notification message being carried, other useful information, such as the validity of the notification message starting from an RTP timestamp, as well as fragmentation and repetition information when needed. Furthermore, RTP provides inherent synchronization information and allows for accurate synchronization of the different media components of a streaming session. RTP also provides mechanisms for sequence numbering and enables identification of lost, duplicate, or out of order packets. Large packets may be fragmented and re-assembled in a media aware manner, which minimizes the distortion in case of loss of a single fragment. RTP's benefits outweigh the benefits of using pure UDP transport.

The notification message can be encapsulated and transmitted as a notification stream. The notification stream can be considered to be a separate stream within a Session Description Protocol (SDP) of the actual service, thus enabling synchronization of the notification stream to the audio/video stream(s). It may be noted that an SDP file can contain information regarding, for example, format, timing, and authorship of the audio/video streams or any other streamed content. Furthermore, as the notification trigger is carried in a separate RTP session, the addition or removal of the notification services is simple and only requires an update of the SDP file. Therefore, audio/video streams of the actual service can remain unmodified. The following is an example of an SDP file that declares a notification stream along with an audio/video stream:

v=0
o=-4 4 IN IP4 172.22.37.66
s=News Channel 15 fps
i=News Channel
e=user@example.com
c=IN IP4 232.0.64.32
b=AS:200
t=0
m=video 38002 RTP/AVP 102
b=AS:140
a=rtpmap:102 H264/90000 a=fmtp:102 profile-level-id=42E00C; packetization-mode=0; sprop-parameter-sets=J0LgHvQKD9CAAAD6AAAdTEeMGVA=, KM4Gcg==;
m=audio 38004 RTP/AVP 104
b=AS:65
a=rtpmap:104 MP4A-LATM/22050/2
a=fmtp:104 profile-level-id=1; config=400027203FC0
m=application 38004 RTP/AVP 106
b=AS:30
a=rtpmap:106 NOTIF/1000
a=fmtp:106 config=AJDk6589MTBeLb93

As shown in the above example, the notification stream type can be "application" and the mime type can be "application/NOTIF". A clock rate of 1000 can be used for notification message streams, which allows for accurate (e.g., up to the millisecond) synchronization. In addition, a configuration parameter encoded in Base 64 may be used to configure the notification message decoder and is given in the fmtp line of the notification stream. It should be noted that the example described herein is not exclusive and other variables, parameters, and/or values may be utilized in implementing various embodiments of the present invention.

Therefore, the payload of the RTP packet can carry the second component of the notification message. It may be noted that this second component can be implemented in a textual format (e.g., Extensible Markup Language (XML) or it may be binarized. Thus, the payload can carry the second pointer to the first component of the notification message, and can also carry information regarding timing constraints and a description of an action to be performed. Although an action generally depends upon a message type, at least certain action types can be defined for the pre-fetching of a notification object, activation of the notification object, and expiration of the notification object.

In other words, the second component/notification trigger fields can be partly included in the RTP header (e.g., timestamp, sequence number, etc. . . . ), RTP payload format (e.g., type, action, filter fields), and partly in the RTP payload. For example, an RTP Payload format for a notification trigger event can include, but is not limited to the following fields: fragmentation information, where if the payload of the notification trigger message is large, application layer fragmentation is done; an identifier of notification trigger for when several notification trigger messages may have the same timestamp and/or when identifying duplicate messages from non-duplicate messages, where a notification trigger message may be sent multiple times to ensure correct delivery; a notification message type to facilitate filtering of notification messages, e.g. a user not interested in voting messages can instruct the mobile terminal 12 to skip notification messages carrying a voting request; a generic filter header, where additional filtering criteria may be defined by the notification service, e.g, for fast access to the filtering data, a customizable filter header can be utilized; and customized filter fields, where the filter fields and their values are indicated by the service description of the notification service.

FIG. 6 illustrates an RTP payload format according to an embodiment of the present invention. An identification field ID 600 can be an 8-bit field, where the pair of the ID 600 and a timestamp can be unique for any two different notification trigger messages. A Type field 610 can be an 8-bit field, which allows the definition of up to 256 different types, based on one or more certain use cases. A FRAG field 620 can indicate whether a current packet is not a fragment (00), a first fragment (01), a fragment (10), or a last fragment (11). A header length field 640 can indicate the length in bytes of the payload format header starting from the ID field 600. An extension header ID 650 can indicate a type of the extension header 670, where the extension header 670 can carry information specific to the current extension header type. A lengthfield LEN 660 can indicate the length of the current extension header as a multiple of 4 bytes. It should be noted that a Reserved field 630 has been left undefined/unoccupied in order to accommodate future needs regarding the RTP payload format.

Referring back to FIG. 1, it may be noted that both the first and the second components of the notification message can be sent via the IPE 22, the FLUTE file server 24, and/or the application server 18. However, as the first component can be larger than the second component, as noted above, the first component can generally be transmitted using broadcast transmission mechanisms, e.g., DVB-H/T transmission, through the IPE 22 and the FLUTE file server 24. The second component, being smaller, can thus be transmitted via the application server 18 to the mobile terminal 12 using an appropriate transport protocol over communications mechanisms, e.g., cellular 3G.

In accordance with one embodiment, the first component of the notification message can be identified by a Universal Resource Identifier (URI) of a file that can contain all of the single fragments of the notification message. According to another embodiment, the URI can refer to a file that can point to other fragments of the notification message. Alternatively, the notification message can be identified with a version of the first component of the notification message in addition to, or in place of the fragment file URI. Alternatively still, the type of access to the streaming session that carries the first component of the notification message can be utilized as an identifier, where the streaming session can be a FLUTE session, an HTTP session, or any other file delivery protocol session. It should be noted that when the FLUTE protocol is utilized, the streaming session description may already be given in a notification service announcement. In other words, the FLUTE session that carries the notification objects of a specific notification service, may be described in, for example, an Acquisition Fragment of the ESG. Alternatively, the first component/notification trigger may carry the first pointer, describe above, to the notification object within a FLUTE session. In addition, the notification object may be located on a remote server and retrieved when needed using the interactive channel. According to one embodiment of the present invention, HTTP can be utilized as a transport protocol.

Therefore, various embodiments allow for the efficient transport of notification messages that have a synchronization requirement associated with a related streaming service. In addition, synchronization can be achieved utilizing RTP. However, any larger components of notification messages need not be carried utilizing RTP, which can be inefficient for the transportation of larger messages. Instead, file delivery protocols can be utilized, such as FLUTE.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
   transmitting a first component of a notification message related to a media broadcast service to a user device via a first transport mechanism;
   transmitting an audio or video data stream related to the media broadcast service via a second transport mechanism; and
   transmitting a second component of the notification message to the user device via the second transport mechanism, wherein the second component of the notification message comprises synchronization information to trigger at least one of interactivity of the first component of the notification message and download of the first component of the notification message to the user device at a specific time instance of the audio or video data stream.

2. The method of claim 1, wherein the first component contains at least one of a description of content of the notification message and content of the notification message.

3. The method of claim 1, wherein the first component is pre-downloaded to the user device before the first component is to be used in a notification operation.

4. The method of claim 1, wherein the first transport mechanism comprises a file delivery protocol.

5. The method of claim 4, wherein the file delivery protocol comprises at least one of a File Delivery over Unidirectional Transport protocol, an Open Mobile Alliance-PUSH protocol, and a Hypertext Transport protocol.

6. The method of claim 1, wherein the first component is identified by at least one of a Universal Resource Identifier of a file, a version of the first component, and an access type of a media broadcast service session carrying the first component.

7. The method of claim 1, wherein the first component is identified by a Universal Resource Identifier of a file containing one of a first plurality of fragments of the notification message and a first pointer to a second plurality of fragments of the notification message.

8. The method of claim 1, wherein the second component is delivered in a synchronized manner with the audio or video data stream.

9. The method of claim 4, wherein the second transport mechanism comprises a real time transport protocol.

10. The method of claim 9, wherein the real time transport protocol utilizes a payload format defined to carry at least one of a notification message type, fragmentation information, repetition information, an identifier of the first component, and filtering information.

11. The method of claim 10, wherein the second component is carried in a textual format.

12. The method of claim 1, wherein the second component comprises a pointer to the first component.

13. The method of claim 12, wherein the pointer enables at least one of locating the first component in a File Delivery over Unidirectional Transport session, and pointing to remotely available media content retrievable over an interactive channel.

14. The method of claim 13, wherein a real time transport protocol payload carries at least one of the pointer, timing constraint information, and information describing the interactivity.

15. The method of claim 1, wherein a notification stream comprising the notification message is declared to be a separate stream in a session description protocol of the media broadcast service.

16. The method of claim 1, wherein the first component is larger in size than the second component.

17. The method of claim 1, wherein the second component contains an indicator configured to trigger pre-downloading of the first component to the user device.

18. A non-transitory computer-readable medium, comprising computer code configured to, with a processor:
   cause transmission of a first component of a notification message related to a media broadcast service to a user device via a first transport mechanism;
   cause transmission of an audio or video data stream related to the media broadcast service via a second transport mechanism; and
   cause transmission of a second component of the notification message to the user device via the second transport mechanism, wherein the second component of the notification message comprises synchronization information to trigger at least one of interactivity of the first component of the notification message and download of the first component of the notification message to the user device at a specific time instance of the audio or video data stream.

19. An apparatus, comprising:
   a processor; and
   memory operatively connected to the processor and including computer code configured with the processor to cause the apparatus to:
   transmit a first component of a notification message related to a media broadcast service to a user device via a first transport mechanism;

transmit an audio or video data stream related to the media broadcast service via a second transport mechanism; and
transmit a second component of the notification message to the user device via the second transport mechanism, wherein the second component of the notification message comprises synchronization information to trigger at least one of interactivity of the first component of the notification message and download of the first component of the notification message to the user device at a specific time instance of the audio or video data stream.

20. The apparatus of claim 19, wherein the first component contains at least one of a description of content of the notification message and content of the notification message.

21. The apparatus of claim 19, wherein the first transport mechanism comprises a file delivery protocol.

22. The apparatus of claim 19, wherein the first component is identified by at least one of a Universal Resource Identifier of a file, a version of the first component, and an access type of a media broadcast service session carrying the first component.

23. The apparatus of claim 19, wherein the first component is identified by a Universal Resource Identifier of a file containing one of a first plurality of fragments of the notification message and a first pointer to a second plurality of fragments of the notification message.

24. The apparatus of claim 19, wherein the second component is delivered in a synchronized manner with the audio or video data stream.

25. The apparatus of claim 21, wherein the second transport mechanism comprises a real-time transport protocol.

26. The apparatus of claim 25, wherein the real-time transport protocol utilizes a payload format defined to carry at least one of a notification message type, fragmentation information, repetition information, an identifier of the first component, and filtering information.

27. The apparatus of claim 19, wherein the second component comprises a pointer to the first component.

28. The apparatus of claim 27, wherein the pointer enables at least one of locating the first component in a File Delivery over Unidirectional Transport session, and pointing to remotely available media content retrievable over an interactive channel.

29. The apparatus of claim 28, wherein a real time transport payload carries at least one of the pointer, timing constraint information, and information describing the interactivity of the first component of the notification message.

30. The apparatus of claim 19, wherein the first component is larger in size than the second component.

31. The apparatus of claim 19, wherein the second component contains an indicator configured to trigger pre-downloading of the first component to the user device.

32. A system, comprising:
a content provider domain including a caption element;
a service provider domain including at least one of a media encoder for receiving a media stream from the caption element, an application server for providing at least a media broadcast service utilizing the media stream via a second transport mechanism, a notification provider for providing first and second components of a notification message via a first transport mechanism and the second transport mechanism, respectively, and a notification gateway; and
a network operator domain including at least one file delivery element for receiving the first component of the notification message from one of the application server, the notification gateway and the notification provider and at least one communication transmission element configured to transmit the first and second components of the notification message to a consumer domain including a user terminal, wherein the second component of the notification message comprises synchronization information to trigger at least one of interactivity of the first component of the notification message and download of the first component of the notification message to the user terminal at a specific time instance of the media stream.

33. The system of claim 32, wherein the first component contains at least one of a description of content of the notification message and content of the notification message.

34. The system of claim 32, wherein the first component is identified by at least one of a Universal Resource Identifier of a file, a version of the first component, and an access type of a media broadcast service session carrying the first component.

35. The system of claim 32, wherein the first component is identified by a Universal Resource Identifier of a file containing one of a first plurality of fragments of the notification message and a first pointer to a second plurality of fragments of the notification message.

36. The system of claim 32, wherein the second component is delivered in a synchronized manner with the media stream via a real time transport protocol.

37. The system of claim 36, wherein the real time transport protocol utilizes a payload format defined to carry at least one of a notification message type, fragmentation information, repetition information, an identifier of the first component, and filtering information.

38. The system of claim 32, wherein the second component comprises a pointer to the first component.

39. The system of claim 38, wherein the pointer enables at least one of locating the first component in a File Delivery over Unidirectional Transport session, and pointing to remotely available media content retrievable over an interactive channel.

40. The system of claim 39, wherein a real-time transport protocol payload carries at least one of the pointer, timing constraint information, and information describing the interactivity of the first component of the notification message.

41. The system of claim 32, wherein the first component is larger in size than the second component.

42. The system of claim 32, wherein the second component contains an indicator configured to trigger pre-downloading of the first component to the user terminal.

43. An apparatus, comprising:
a first means for transmitting a first component of a notification message related to a media broadcast service to a user device via a first transport mechanism;
a second means for transmitting an audio or video data stream related to the media broadcast service via a second transport mechanism; and
a third means for transmitting a second component of the notification message to the user device via the second transport mechanism, wherein the second component of the notification message comprises synchronization information to trigger at least one of interactivity of the first component of the notification message and download of the first component of the notification message to the user device at a specific time instance of the audio or video data stream.

44. The apparatus of claim 43, wherein the first component contains at least one of a description of content of the notification message and content of the notification message.

45. The apparatus of claim 43, wherein the first transport mechanism comprises a file delivery protocol that comprises at least one of a File Delivery over Unidirectional Transport protocol, an Open Mobile Alliance-PUSH protocol, and a Hypertext Transport protocol.

46. The apparatus of claim 43, wherein the second component is delivered in a synchronized manner with the audio or video data stream of the media broadcast service.

47. The apparatus of claim 43, wherein the second transport mechanism comprises a real-time transport protocol.

48. The apparatus of claim 43, wherein the first component is larger in size than the second component.

49. The apparatus of claim 43, wherein the second component contains an indicator configured to trigger pre-downloading of the first component to the user device.

* * * * *